United States Patent
Gwidt et al.

(10) Patent No.: US 11,614,042 B1
(45) Date of Patent: Mar. 28, 2023

(54) COMPRESSION RATIO METHODS AND SYSTEMS FOR PARTICULATE FILTER REGENERATION

(71) Applicant: GM GLOBAL TECHNOLOGY OPERATIONS LLC, Detroit, MI (US)

(72) Inventors: J. Michael Gwidt, Brighton, MI (US); Andrew B Gillett, Bloomfield Township, MI (US); Karen Margaret-Bell Gwidt, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/664,404

(22) Filed: May 20, 2022

(51) Int. Cl.
| | | |
|---|---|---|
| *F02D 15/00* | (2006.01) | |
| *F02D 41/02* | (2006.01) | |
| *F02D 41/14* | (2006.01) | |
| *F02D 15/02* | (2006.01) | |
| *F02D 15/04* | (2006.01) | |

(52) U.S. Cl.
CPC .......... *F02D 41/029* (2013.01); *F02D 15/00* (2013.01); *F02D 15/02* (2013.01); *F02D 15/04* (2013.01); *F02D 41/024* (2013.01); *F02D 41/027* (2013.01); *F02D 41/0245* (2013.01); *F02D 41/1446* (2013.01); *F02D 41/1482* (2013.01); *F02D 41/1483* (2013.01); *F02D 2200/101* (2013.01); *F02D 2250/18* (2013.01)

(58) Field of Classification Search
CPC .......... F02D 15/00; F02D 15/02; F02D 15/04; F02D 41/024; F02D 41/0245; F02D 41/027; F02D 41/029

USPC .......... 60/284, 285, 295, 300, 320; 123/78 R
See application file for complete search history.

(56) References Cited

U.S. PATENT DOCUMENTS

| | | | | |
|---|---|---|---|---|
| 5,398,502 A | * | 3/1995 | Watanabe | F02D 13/0207 60/284 |
| 6,513,319 B2 | * | 2/2003 | Nozawa | F02D 41/024 60/284 |
| 7,191,589 B2 | * | 3/2007 | Yasui | F02D 13/023 60/284 |
| 11,352,968 B1 | * | 6/2022 | Kiwan | F02D 41/401 |
| 2003/0213451 A1 | * | 11/2003 | Aoyama | F01L 1/344 123/90.15 |

(Continued)

FOREIGN PATENT DOCUMENTS

| | | | | |
|---|---|---|---|---|
| CN | 114763757 A | * | 7/2022 | .......... B60W 10/06 |
| WO | WO-2020122807 A1 | * | 6/2020 | .......... F01N 11/00 |

*Primary Examiner* — Erick R Solis
(74) *Attorney, Agent, or Firm* — Lorenz & Kopf LLP

(57) ABSTRACT

Methods and systems for enabling regeneration of a particulate filter of an engine system are provided. In one embodiment, a method includes: receiving, by a processor, a request for particulate filter regeneration; in response to the request, determining, by the processor, at least one of a compression ratio and an expansion ratio; generating, by the processor, control signals to actuators of the engine system to adjust the at least one of the compression ratio and the expansion ratio to achieve a desired exhaust temperature; generating, by the processor, control signals to actuators of the engine system to optimize torque output based on the desired exhaust temperature, engine speed, and a desired engine load; and initiating, by the processor, regeneration of the particulate filter based on the command signals.

20 Claims, 2 Drawing Sheets

(56) References Cited

U.S. PATENT DOCUMENTS

2007/0251216 A1* 11/2007 Easley .................... F01N 3/027
60/285
2019/0024552 A1* 1/2019 Uhrich .................... F02D 37/02
2021/0355888 A1* 11/2021 Hedman ................. F02B 75/04

* cited by examiner

COMPRESSION RATIO METHODS AND SYSTEMS FOR PARTICULATE FILTER REGENERATION

INTRODUCTION

The present disclosure generally relates to the regeneration of a particulate filter in the exhaust system of a gasoline engine, and more specifically to methods and systems for controlling regeneration of the particulate filter based on a variable compression ratio and torque output.

Gasoline engines may be equipped with exhaust systems that include filters to remove particulate matter from the exhaust gas stream. A particulate filter may include a housing containing a multiple passageway substrate/media that captures particles as the exhaust gas passes through. One such substrate may include a honeycomb-like structure where the exhaust gases pass through the cells. The substrate/media is regenerated to remove built-up particles such as by subjecting the unit to conditions, including temperatures and gas compositions, to burn off the particles.

Some systems initiate regeneration by actively raising the temperature of exhaust gas passing through the particulate filter. Actively raising the temperature of exhaust gas may compromise engine torque performance.

Accordingly, it is desirable to provide improved methods and systems that enable particulate filter regeneration, while optimizing engine torque performance. Furthermore, other desirable features and characteristics of the present invention will become apparent from the subsequent detailed description and the appended claims, taken in conjunction with the accompanying drawings and the foregoing technical field and background.

SUMMARY

Methods and systems for enabling regeneration of a particulate filter of an engine system are provided. In one embodiment, a method includes: receiving, by a processor, a request for particulate filter regeneration; in response to the request, determining, by the processor, at least one of a compression ratio and an expansion ratio; generating, by the processor, control signals to actuators of the engine system to adjust the at least one of the compression ratio and the expansion ratio to achieve a desired exhaust temperature; generating, by the processor, control signals to actuators of the engine system to optimize torque output based on the desired exhaust temperature, engine speed, and a desired engine load; and initiating, by the processor, regeneration of the particulate filter based on the command signals.

In various embodiments, the compression ratio is increased to increase the exhaust temperature.

In various embodiments, the expansion ratio is reduced to increase the exhaust temperature.

In various embodiments, the actuators of the engine system to optimize torque are associated with valve timing.

In various embodiments, the actuators of the engine system to optimize torque are associated with ignition timing.

In various embodiments, the actuators of the engine system to optimize torque are associated with injection timing.

In various embodiments, the actuators of the engine system to optimize torque are associated with the compression ratio or the expansion ratio.

In various embodiments, the method includes determining the control signals to adjust the at least one of the compression ratio and the expansion ratio based on a model predictive control model.

In various embodiments, the method includes determining the control signals to adjust the at least one of the compression ratio and the expansion ratio based on a proportional-integral-derivative model.

In various embodiments, the method includes determining the control signals to optimize torque output based on a model predictive control model.

In various embodiments, the method includes determining the control signals to optimize torque output based on a proportional-integral-derivative model.

In another embodiment, a system includes an internal combustion engine configured to vary at least one of a compression ratio and an expansion ratio; a processor in communication with the engine system and configured to: receive a request for particulate filter regeneration; in response to the request, determine at least one of a compression ratio and an expansion ratio; generate control signals to actuators of the engine system to adjust the at least one of the compression ratio and the expansion ratio to achieve a desired exhaust temperature; generate control signals to actuators of the engine system to optimize torque output based on the desired exhaust temperature, engine speed, and a desired engine load; and initiate regeneration of the particulate filter based on the command signals.

In various embodiments, the compression ratio is increased to increase the exhaust temperature.

In various embodiments, the expansion ratio is reduced to increase the exhaust temperature.

In various embodiments, the actuators of the engine system to optimize torque are associated with valve timing.

In various embodiments, the actuators of the engine system to optimize torque are associated with ignition timing.

In various embodiments, the actuators of the engine system to optimize torque are associated with injection timing.

In various embodiments, the actuators of the engine system to optimize torque are associated with the compression ratio or the expansion ratio.

In various embodiments, the processor is further configured to determine the control signals to adjust the at least one of the compression ratio and the expansion ratio based on at least one of a proportional-integral-derivative model and a model predictive control model.

In various embodiments, the processor is further configured to determine the control signals to optimize torque output based on based on at least one of a proportional-integral-derivative model and a model predictive control model.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
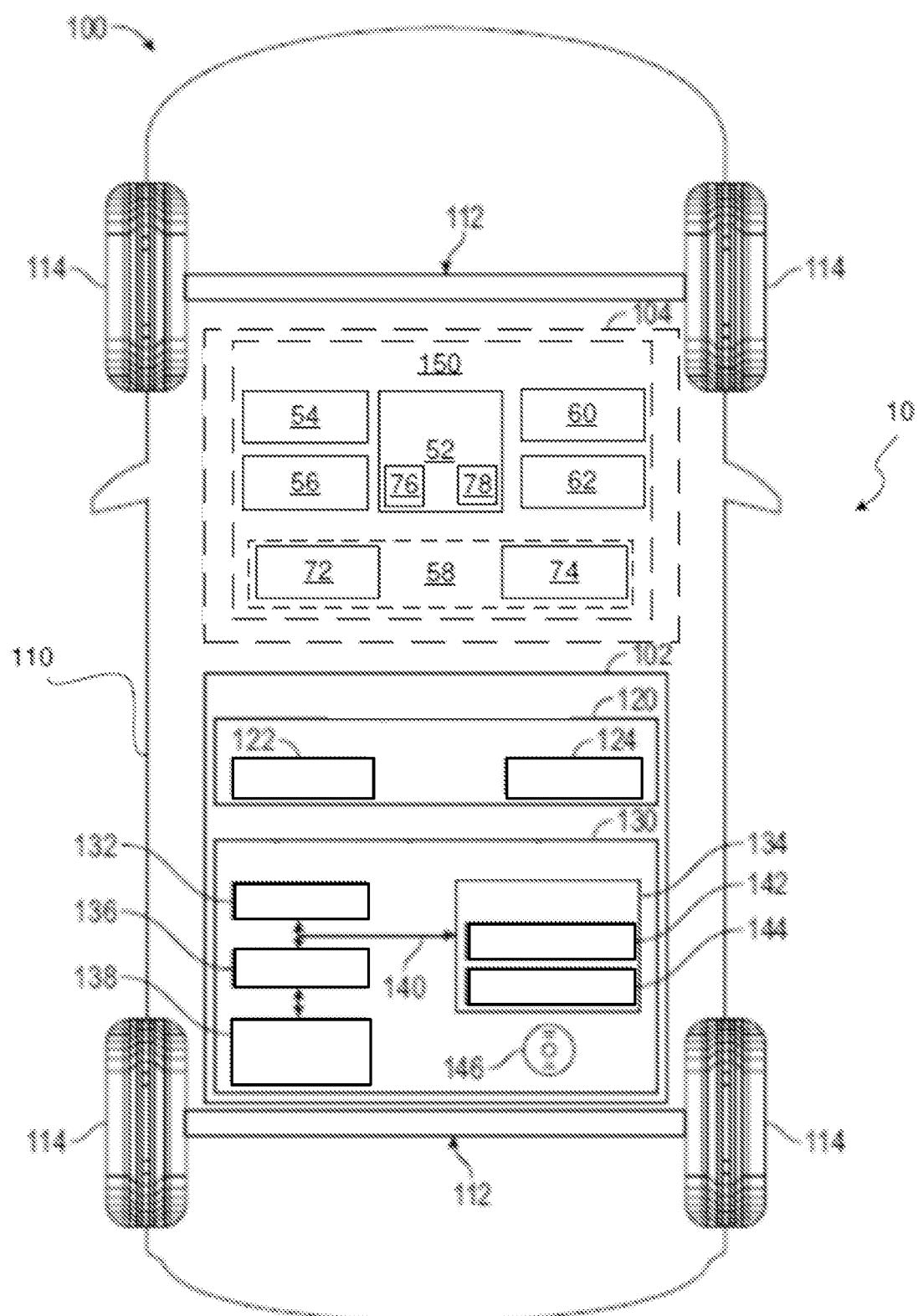
FIG. 1 is a functional diagram of a vehicle that includes a drive system having a particulate filter and a control system, in accordance with an exemplary embodiment.

FIG. 1 illustrates a vehicle 100, having a regeneration system 10 according to an exemplary embodiment. In various embodiments, the regeneration system 10 initiates regeneration of a particulate filter (PF) based on a compression ratio and a torque output.

In certain embodiments, the vehicle 100 comprises an automobile. As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a truck, a watercraft, an aircraft, and/or one or more other types of vehicles. In addition, in various embodiments, it will also be appreciated that the vehicle 100 may comprise any number of other types of mobile platforms that produce exhaust gas.

In the depicted embodiment, the vehicle 100 includes a body 110 that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

The vehicle 100 further includes a control system 102 and a drive system 104. The drive system 104 drives the wheels 114 to rotate in a forward direction or a backward direction. In the depicted embodiment, the drive system 104 comprises an engine system 150. The engine system 150 generally includes a number of components and subsystems including an engine 52, an intake system 54, a fuel system 56, an exhaust system 58, a valve system 60, and an ignition system 62. In various embodiments, the engine system 150 is a four stroke internal combustion engine in which a piston in each cylinder completes an intake stroke, a compression stroke, a combustion stroke, and an exhaust stroke while turning a crankshaft to drive the engine 52. The intake system 54 delivers air and controls the air's mass flow rate to the cylinders via a throttle. The fuel system 56 delivers fuel to the cylinders and controls its timing and amount via a number of injectors. The valve system 60 includes a number of valves to control the flow of air/gases into and out of the cylinders. The ignition system 62 includes a number of spark plugs that initiate combustion in the cylinders.

The exhaust system 58 conveys combustion gases from the engine 52 to the environment and includes aftertreatment devices such as a three-way catalytic converter 72 and a particulate filter 74. For example, the exhaust system 58 directs the exhaust gases through the aftertreatment devices and out through, for example, a tailpipe. The aftertreatment devices may be arranged in any of several different configurations. For example, the particulate filter 74 may be downstream from the three-way catalytic converter 72 as shown, or may be upstream therefrom in other embodiments. In some embodiments, the particulate filter 74 may internally include the three-way catalyst with or without a separate three-way catalytic converter 72. The three-way catalytic converter 72, and/or the catalyst in the particulate filter 74 is configured to convert hydrocarbons, carbon monoxide and nitrogen oxides to innocuous elements or compounds. The particulate filter 74 captures particulate matter an includes an internal substrate.

In this embodiment, the engine 52 is configured as a variable compression ratio (VCR) engine where the compression ratio (CR) and the expansion ratio (ER) of each cylinder (i.e., a ratio of a cylinder volume when the piston is at bottom-dead-center (BDC) to a cylinder volume when the piston is at top-dead-center (TDC)) can be mechanically altered. The ratios of the cylinder may be varied via an actuator 76 actuating a mechanism 78. In various embodiments, the ratios may be varied between a first, lower ratio where the ratio of the cylinder volume when the piston is at BDC to the cylinder volume when the piston is at TDC is smaller and a second, higher ratio where the ratio is higher. In various other embodiments, there may be predefined number of stepped compression ratios between the first, lower ratio and the second, higher ratio. Further still, the ratio may be continuously variable between the first, lower ratio and the second, higher ratio (to any ratio in between). In various embodiments, the ratio may be varied independently, for each cylinder, during the compression strokes of the cylinder and during the expansion strokes of the cylinder.

As can be appreciated, various actuators 76 and mechanisms 78 that mechanically alter the compression ratio and the expansion ratio may be used. For example, the ratio of the engine may be varied via a mechanism 78 that changes a position of the piston or changes a cylinder head volume (that is, the clearance volume in the cylinder head). In another example, the mechanism 78 may include a hydraulic pressure-reactive, air pressure-reactive, or mechanically reactive piston. Further still, the mechanism 78 may include a multi-link mechanism, a bent rod mechanism, or other variable compression/expansion ratio mechanizations.

In various embodiments, the control system 102 provides instructions for controlling the drive system 104, including for controlling the engine system 150. In various embodiments, the control system 102 comprises an engine control unit (ECU) for the engine system 150. Also in various embodiments, among other functionality, the control system 102 selectively controls operation of the CR components, to achieve exhaust temperatures sufficient to initiate regeneration of particulate soot buildup in the particulate filter 74 while achieving a desired torque output. In various embodiments, the control system 102 provides these functions in accordance with the steps of the process 200 described further below in connection with the FIG. 2.

As depicted in FIG. 1, in various embodiments, the control system 102 includes a sensor array 120 and a controller 130. In various embodiments, the sensor array 120 includes sensors for measuring observable conditions and generating sensor data based thereon. As depicted in FIG. 1, in various embodiments, the sensor array 120 includes one or more engine sensors 122. In various embodiments, the engine sensors 122 are attached to, disposed within, or otherwise disposed in proximity to the engine system 150 such that various temperatures, positions, speeds, and other observable parameters can be measured. In certain embodiments, the sensor array 120 may also include one or more other sensors 124, for example for operation of the engine. For example, in certain embodiments, the other sensors 124 may include one or more ignition sensors for detecting when the engine 52 is turned on and/or running, and so on.

In various embodiments, the controller 130 is coupled to the sensor array 120, and provides instructions for controlling the engine system 150 (including controlling initiation of regeneration) based on the sensor data. As depicted in FIG. 1, the controller 130 comprises a computer system. In certain embodiments, the controller 130 may also include the sensor array 120 and/or one or more other vehicle components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 140. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130 and the computer system of the controller 130, generally in executing the processes described herein, such as the process 200 discussed further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 (e.g., including, in various embodiments, predetermined threshold values for controlling emissions of the drive system).

The bus 140 serves to transmit programs, data, status and other information or signals between the various components of the computer system of the controller 130. The interface 136 allows communications to the computer system of the controller 130, for example from a system driver and/or another computer system, and can be implemented using any suitable method and apparatus. In one embodiment, the interface 136 obtains the various data from the sensor array 120, the drive system 104, the drive system 104, and/or one or more other components and/or systems of the vehicle 100. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including various different types of direct access storage and/or other memory devices. In one exemplary embodiment, the storage device 138 comprises a program product from which memory 134 can receive a program 142 that executes one or more embodiments of one or more processes of the present disclosure, such as the steps of the process 200 discussed further below in connection with FIG. 2. In another exemplary embodiment, the program product may be directly stored in and/or otherwise accessed by the memory 134 and/or one or more other disks 146 and/or other memory devices.

The bus 140 can be any suitable physical or logical means of connecting computer systems and components. This includes, but is not limited to, direct hard-wired connections, fiber optics, infrared, and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

Figure 2:
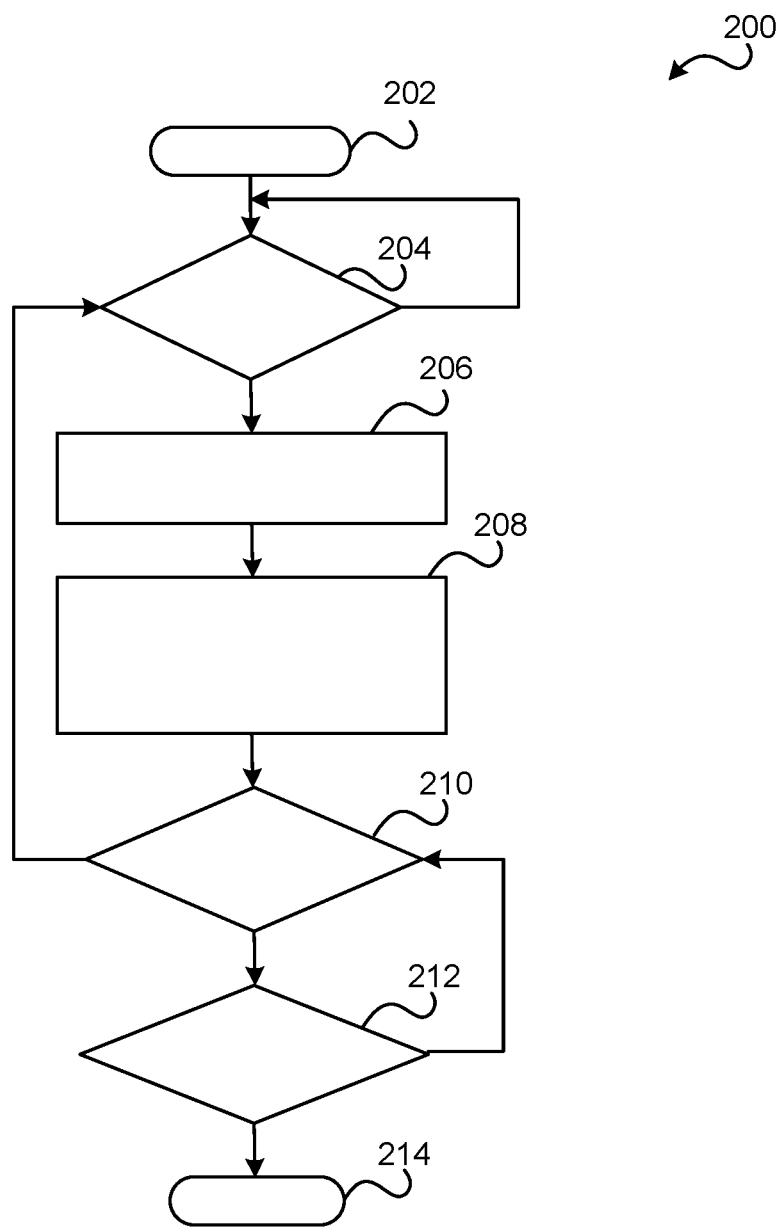
FIG. 2 is a flowchart of a process for initiating particulate filter regeneration in connection with the vehicle and the control system of FIG. 1, in accordance with an exemplary embodiment.

With reference now to FIG. 2, a flowchart illustrates a process 200 for controlling regeneration of the particulate filter 74 of the engine system 150 of FIG. 1 in accordance with exemplary embodiments. In various embodiments, the process 200 may be implemented in connection with the vehicle 100 of FIG. 1, including the control system 102 and the drive system 104 thereof.

As depicted in FIG. 2, the process 200 may begin at 202. In certain embodiments, the process 200 begins when one or more events occur to indicate that a vehicle drive is taking place or about to take place, such as a driver, operator, or passenger entering the vehicle 100, an engine or motor of the vehicle 100 being turned on, a transmission of the vehicle 100 being placed in a "drive" mode, or the like. In various embodiments, the event(s) triggering the starting of the process 200 are determined based on sensor data from one or more of the other sensors 124 of FIG. 1 (e.g., from ignition sensors in certain embodiments). Also in certain embodiments, the control system 102 is turned on, or "woken up" as part of step 202.

The process 200 then monitors for a request for particulate filter regeneration at 204. When a request for particulate filter regeneration is received at 204, the compression ratio and the expansion ratio are optimized at 206 by, for example, generating control signals to the actuators 76. For example, the compression ratio may be increased to increase the exhaust temperature. In another example, the expansion ratio is reduced to increase the exhaust temperature. In various embodiments, the control signals are generated by one or more proportional-integral-derivative (PID) controllers or model predictive controllers (MPC) that utilize trained models to achieve the desired exhaust temperature. The compression ratio and the expansion ratio for a desired exhaust temperature is learned for the particular engine system 150.

Substantially simultaneously, the engine system 150 is further controlled to optimize torque output at 208 by generating control signals as a function of the desired exhaust temperature, engine speed, and a desired engine load. For example, the control signals control other actuators of the engine system 150 such as valve timing, ignition timing, injection timing, and compression ratio or expansion ratio mechanisms to maintain the requested engine output while providing sufficient exhaust enthalpy to reach the desired exhaust temperature. In various embodiments, the control signals are generated by one or more proportional-integral-derivative (PID) controllers or model predictive controllers (MPC) that utilize trained models to achieve the optimized torque output. The optimized torque output is learned for the particular engine system 150.

Once the exhaust temperature has reached a target temperature in order to initiate regeneration at 210, it is determined whether the regeneration is complete at 212 (e.g., regeneration has occurred for a defined time period, etc.). Once regeneration is complete at 212, the process 200 may end at 214.

Accordingly, systems and methods provide a mechanism regenerate a particulate filter based on a reduced compression ratio while still optimizing the torque output. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for enabling regeneration of a particulate filter of an engine system, the method comprising:
    receiving, by a processor, a request for particulate filter regeneration;
    in response to the request, determining, by the processor, a compression ratio and an expansion ratio;
    generating, by the processor, control signals to actuators of the engine system to independently adjust the compression ratio and the expansion ratio to achieve a desired exhaust temperature;
    generating, by the processor, control signals to actuators of the engine system to optimize torque output based on the desired exhaust temperature, engine speed, and a desired engine load; and
    initiating, by the processor, regeneration of the particulate filter based on the command signals.

2. The method of claim 1, wherein the compression ratio is increased to increase the exhaust temperature, and wherein the expansion ratio is reduced to increase the exhaust temperature.

3. The method of claim 1, wherein the actuators of the engine system to optimize torque are associated with valve timing.

4. The method of claim 1, wherein the actuators of the engine system to optimize torque are associated with ignition timing.

5. The method of claim 1, wherein the actuators of the engine system to optimize torque are associated with injection timing.

6. The method of claim 1, wherein the actuators of the engine system to optimize torque are associated with the compression ratio or the expansion ratio.

7. The method of claim 1, further comprising determining the control signals to adjust the at least one of the compression ratio and the expansion ratio based on a model predictive control model.

8. The method of claim 1, further comprising determining the control signals to adjust the at least one of the compression ratio and the expansion ratio based on a proportional-integral-derivative model.

9. The method of claim 1, further comprising determining the control signals to optimize torque output based on a model predictive control model.

10. The method of claim 1, further comprising determining the control signals to optimize torque output based on a proportional-integral-derivative model.

11. A system for enabling regeneration of a particulate filter, the system comprising:
    an engine system configured to vary at least one of a compression ratio and an expansion ratio; and
    a processor in communication with the engine system and configured to:
        receive a request for particulate filter regeneration;
        in response to the request, determine a compression ratio and an expansion ratio;

generate control signals to actuators of the engine system to independently adjust the compression ratio and the expansion ratio to achieve a desired exhaust temperature;

generate control signals to actuators of the engine system to optimize torque output based on the desired exhaust temperature, engine speed, and a desired engine load; and initiate regeneration of the particulate filter based on the command signals.

12. The system of claim 11, wherein the compression ratio is increased to increase the exhaust temperature.

13. The system of claim 11, wherein the expansion ratio is reduced to increase the exhaust temperature.

14. The system of claim 11, wherein the actuators of the engine system to optimize torque are associated with valve timing.

15. The system of claim 11, wherein the actuators of the engine system to optimize torque are associated with ignition timing.

16. The system of claim 11, wherein the actuators of the engine system to optimize torque are associated with injection timing.

17. The system of claim 11, wherein the actuators of the engine system to optimize torque are associated with the compression ratio or the expansion ratio.

18. The system of claim 11, wherein the processor is further configured to determine the control signals to adjust the at least one of the compression ratio and the expansion ratio based on at least one of a proportional-integral-derivative model and a model predictive control model.

19. The system of claim 11, wherein the processor is further configured to determine the control signals to optimize torque output based on based on at least one of a proportional-integral-derivative model and a model predictive control model.

20. The method of claim 1, further comprising independently adjusting the compression ratio and the expansion ratio for each cylinder of the engine system to achieve a desired exhaust temperature.

* * * * *